United States Patent [19]
Nelson

[11] 3,887,512
[45] June 3, 1975

[54] PLASTICIZED VINYL CHLORIDE POLYMERS

[75] Inventor: David A. Nelson, Littleton, Colo.

[73] Assignee: The Dow Chemical Company, Midland, Mich.

[22] Filed: Mar. 7, 1974

[21] Appl. No.: 449,145

[52] U.S. Cl. .................. 260/33.2 R; 260/DIG. 43
[51] Int. Cl. ............................................ C08f 45/34
[58] Field of Search .... 260/33.2 R, 613 R, 45.95 G, 260/DIG. 43

[56] References Cited
UNITED STATES PATENTS
2,193,614  3/1940  Alexander .................. 260/33.2 R OTHER PUBLICATIONS
Chemical Abstracts, Vol. 69, (1968), "Chloromethylation of phenylether," 10150n.
Chemical Abstracts, Vol. 72, (1970), "Condensation of alkylphenyl ethers with α-chloroalkyl ethers," 31358p.

*Primary Examiner*—Allan Lieberman
*Attorney, Agent, or Firm*—Ronald G. Brookens

[57] ABSTRACT

Plasticized vinyl chloride polymer containing a major proportion of polymerized vinyl chloride and as a plasticizing agent therefore a compound of the formula:

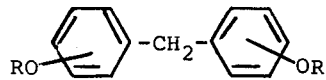

wherein R is selected from the group consisting of phenyl or alkyl of from 1 to 4 carbons.

5 Claims, No Drawings

PLASTICIZED VINYL CHLORIDE POLYMERS

BACKGROUND OF THE INVENTION

The phthalate esters, particularly di-(2-ethylhexyl)phthalate and the like, are the major plasticizing agents used in vinyl chloride polymers and particularly, polyvinyl chloride. Such plasticizing agents are not readily biodegradable, however, and have been shown to bioaccumulate in crustaceans, fish and mammals. The compounds, as described herein, have shown significant plasticizer activity in vinyl chloride polymers, are more readily capable of biodegradation and thus are ecologically desirable substitutes for various plasticizer applications.

SUMMARY

Plasticized vinyl chloride polymers are formed by utilization, as a plasticizing agent, of from about 40 to about 60 parts per hundred parts of polymer of a compound of the formula:

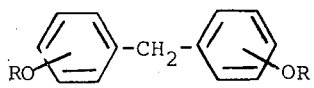

wherein R is selected from the group consisting of phenyl or alkyl containing from 1 to 4 carbons.

DESCRIPTION OF THE PREFERRED EMBODIMENTS

This invention is applicable to vinyl chloride polymers as a class and within this term are included both polyvinyl chloride and copolymers of vinyl chloride in a major proportion with other compounds, especially vinyl compounds, in a minor proportion by weight of the final resin. The vinyl chloride can be polymerized in bulk, in solution or as an emulsion of liquid vinyl chloride in water. After-chlorinated polyvinyl chloride also can be treated in accordance with the invention.

The molecular weight of the vinyl chloride polymer is not critical, and would be selected to produce a composition of the desired softening point after plasticization. The molecular orientation of the polymers is not critical. The polymers and copolymers can contain stabilizers against decomposition if desired; conventional stabilizers well known to the art can be used.

The plasticizing agents used herein may be any compound having the formula:

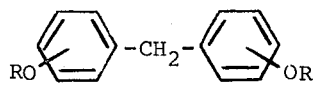

wherein R is selected from the group consisting of phenyl or alkyl containing from 1 to 4 carbons. Exemplary of such compounds are the ortho, meta and para bis(methoxyphenyl)methanes, bis(ethoxyphenyl)methanes, bis(butoxyphenyl)methanes, bis(phenoxyphenyl)methanes and the 1-(alkoxyphenyl)-1-(phenoxyphenyl)methanes.

The plasticizing agents may be employed in any amount which is compatible with the vinyl chloride polymer. Generally, however, amounts of such compounds of from about 40 to about 60 parts per one hundred parts of polymer, are preferred.

The following specific example illustrates the present invention but is not to be construed as limiting:

EXAMPLE

A. Preparation of Bis(phenoxyphenyl)methane

To 510 grams (3 moles) of diphenyl oxide was added 48.9 grams (1.5 moles) of 92 percent paraformaldehyde and 600 grams of 88 percent formic acid in a 2 liter, 3 necked, round bottom flask equipped with condenser and nitrogen inlet. The mixture was then placed under about 2.5 pounds pressure (via nitrogen through a mercury trap). The solution was then refluxed for about 6 hours. Residual formic acid, water and diphenyl oxide were removed under vacuum (200°C for 45 minutes) and the remaining bis(phenoxyphenyl)methane, having a melting point of about 60°C, was used as the sole plasticizer for polyvinylchloride.

B. Plasticization of Polyvinylchloride

To 200 grams of polyvinylchloride resin (Geon 102 EP), which was warmed to a temperature of 88°C in a powder head of a Brabender instrument, was added, over a 3 minute period, 80 grams of the bis(phenoxyphenyl)methane, prepared as described in A, supra. The dry-up time, i.e., the time required for the blend to assume an essentially dry consistency, was about 4 minutes. The powder containing the bis(phenoxyphenyl)methane was then heated at 170°C in the fusion head of the Brabender instrument until the fusion point of the mixture had been surpassed. The resulting gum-like mass was then cut into individual pieces and molded at 170°C, under a pressure of about 20 tons, over a period of from about 3 to 5 minutes, or, alternatively, cooled and ground in the presence of liquid nitrogen for powder molding. Utilization of either procedure resulted in molded articles having significantly improved flexibility and strength properties as compared to the designated nonplasticized polyvinylchloride resin.

Additional experiments conducted as set forth herein, showed that the use of bis(methoxyphenyl)methane as the sole plasticizing agent for the designated polyvinylchloride resin provided a "dry-up" time of about 3.7 minutes; the use of bis(ethoxyphenyl)methane as the sole plasticizing agent provided a "dry-up" time of about 5.5 minutes, and that the use of such plasticizing agents also provided molded articles having significantly improved flexibility and strength properties as compared to molded articles formed from the nonplasticized polyvinylchloride resin.

By way of comparison, utilization, in the manner described herein, of higher molecular weight derivatives of the prescribed plasticizing agents, e.g., the trimers and tetramers thereof, failed to provide adequate plasticization of the polyvinylchloride polymer. More specifically, the use as a plasticizing agent of a (phenoxyphenyl)methane reaction mixture containing greater than about 35 percent trimer, or higher molecular weight derivatives, was found to be incapable of providing significant improvement in flexibility of the polyvinylchloride resin.

What is claimed is:

1. A plasticized vinyl chloride polymer containing a major proportion of polymerized vinyl chloride and as a plasticizing agent therefore from between about 40 to about 60 parts per hundred parts of polymer of a compound of the formula:

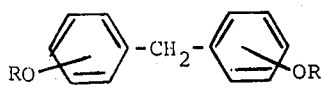

wherein R is selected from the group consisting of phenyl and alkyl containing from 1 to 4 carbon atoms.

2. The composition of claim 1 wherein said vinyl chloride polymer is polyvinylchloride.

3. The composition of claim 2 wherein said plasticizing agent is bis(phenoxyphenyl)methane.

4. The composition of claim 2 wherein said plasticizing agent is bis(methoxyphenyl)methane.

5. The composition of claim 2 wherein said plasticizing agent is bis(ethoxyphenyl)methane.

* * * * *